United States Patent Office 2,910,100
Patented Oct. 27, 1959

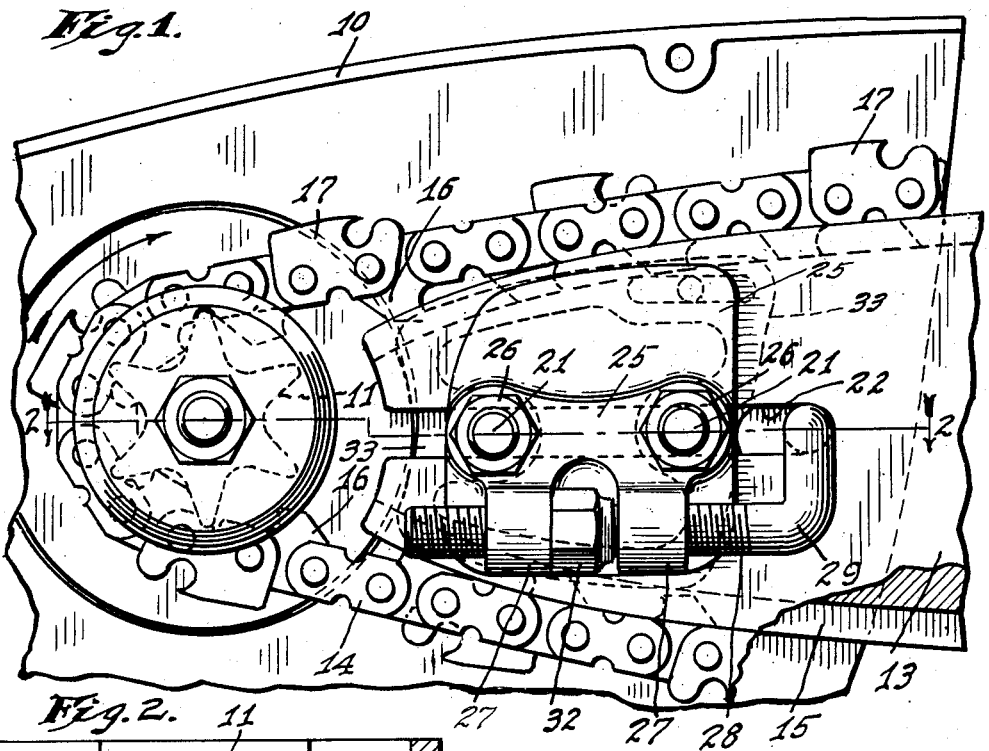
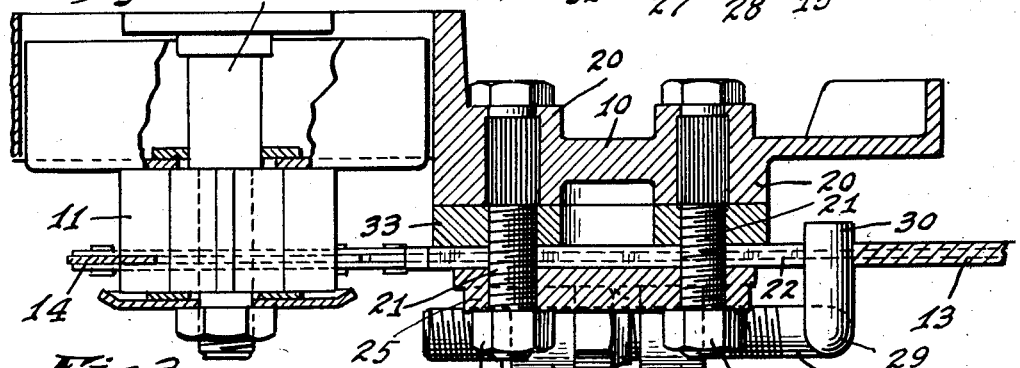
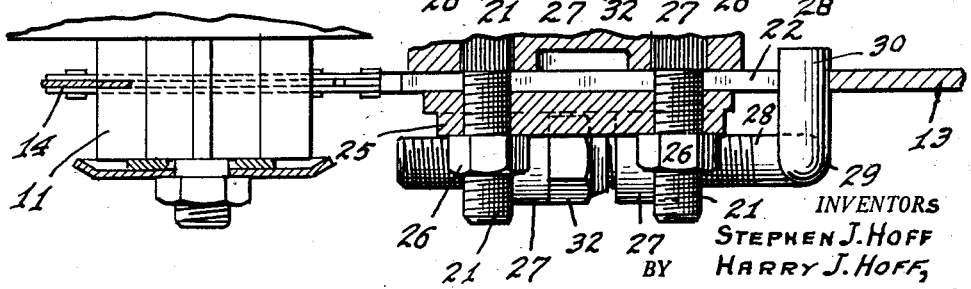

2,910,100

CHAIN SAW

Stephen J. Hoff and Harry J. Hoff, Richmond, Ind., assignors to Hoffco, Inc., Richmond, Ind., a corporation of Indiana Application January 17, 1958, Serial No. 709,706

4 Claims. (Cl. 143—32)

This invention relates to chain saws and more particularly to means designed to eliminate difficulties arising in the use of chain saws as a result of excessive wear on the chain-driving sprocket. To avoid excessive weight and size, the chain-driving sprocket of a chain saw commonly embodies a small number of teeth and the chain is relatively narrow to permit it and its supporting plate to pass into and through the kerf which the saw cuts. As a result of the narrow width of the chain, unit pressures on the teeth of the drive sprocket are relatively high; and because there are only a few of such teeth, wear is rapid.

It is an object of this invention to reduce the frequency with which the driving sprockets of chain saws are replaced as the result of wear occurring in use.

In carrying out our invention, we employ a chain-driving sprocket of at least double the width required for cooperation with the chain; and we provide means whereby the chain and its supporting plate can be mounted on the frame of the machine in a plurality of positions spaced axially of the sprocket, such positions being separated by a distance at least somewhat greater than the width of the sprocket-engaging chain-teeth. Conveniently, the chain saw as produced by the manufacturer includes a spacer block which intervenes between the saw plate and the frame of the machine and which is clamped in such position by the bolts or other means employed to secure the plate to the frame. The thickness of the spacer is substantially greater than the width of the sprocket-engaging portions of the chain. When the sprocket has worn to a point such as to interfere with proper operation of the saw, the plate is removed, the spacer withdrawn, and the plate remounted against the frame of the machine, thus moving the plate and chain into a new axial position where the chain engages an unworn portion of the sprocket.

Further objects and features of the invention will become apparent from the following description and from the accompanying drawing, in which:

Fig. 1 is a fragmental elevation of a portion of a chain saw;

Fig. 2 is a fragmental section on the line 2—2 of Fig. 1 illustrating the saw with the spacer in place; and Fig. 3 is a view similar to Fig. 2 illustrating the saw after the spacer has been removed.

The device illustrated in the drawing comprises a frame 10 which supports an engine or motor (not shown) having an output shaft 11. Such output shaft projects beyond the side of the frame and has a chain-driving sprocket 11 rigidly secured to it. As my invention is not concerned with details of the motor or its mounting, and as chain-saw constructions of the general type indicated in the drawing are well known and readily understood, I have not attempted to illustrate the motor and its mounting.

In addition to the frame and drive sprocket 11, the chain saw includes a plate or blade 13 which is removably attached to the frame and projects therefrom to support the chain 14. To guide the chain along the periphery of the plate 13, the edge of the latter has a groove 15 which receives guide teeth 16 on certain of the links of the chain. Other links of the chain carry cutting teeth 17, as will be understood.

For the purpose of locating the plate on the frame 10, the latter is shown as provided with a pair of spaced bosses 20 from each of which a bolt or stud 21 projects. As is common in chain saws, the inner end of the plate 13 has a longitudinally extending, open-ended slot 22 which slidably receives the bolts or studs 21. This arrangement locates the plate on the frame for longitudinal adjustment such as is necessary to maintain the chain 14 properly tight.

Located against the outer face of the plate 13 is a clamp plate 25 having openings for the passage of the studs 21. Nuts 26 on the outer ends of the studs 21 engage the clamp plate to draw it against the face of the plate 13. As shown, the clamp plate has a pair of downwardly projecting ears 27 having aligned openings which slidably receive the screw-threaded shank 28 of a chain-tightening member 29. The outer end of the member 29, which is conveniently made of round stock, is bent to provide a laterally projecting finger 30 receivable in the closed end of the slot 22. A nut 32 mounted on the shank 22 between the ears 27 may be rotated to force the chain-tightening member outwardly, such movement being transmitted to the plate 13 through the end portion 30 and serving to tighten the chain.

In accordance with the invention to which this application is directed, the chain-driving sprocket 11 has a face-width substantially greater than the width of the chain 14, and provision is made for locating the plate 13 in different axial positions with respect to the sprocket. As shown, such provision includes a spacer block 33 adapted to be disposed between the plate 13 and the faces of the bosses 20, such spacer block having openings for passage of the studs 21. The thickness of the spacer block is greater than the width of the chain. The block may be made of some low-priced material so that it can be disposed of without loss when it has served its purpose.

Desirably, as the chain saw is constructed by the manufacturer, the spacer block 33 is in place between the plate 13 and the frame of the machine, thus locating the chain 14 near the outer end of the sprocket 11. When the chain-engaged portion of the sprocket has worn to such an extent that further operation is undesirable, the nuts 26 are loosened or removed to permit withdrawal of the spacer block 33. With the spacer block withdrawn, the nuts are again tightened to clamp the plate 13 directly against the end faces of the bosses 20, thus moving the plate 13 and the chain axially of the sprocket into a position such that the chain will engage sprocket-portions not previously subjected to wear.

As the chain-adjusting member 29 is carried from the clamp plate 25, and as such clamp plate is always in the same position relative to the plate 13, the presence or absence of the spacer block 33 does not interfere with engagement of the base of the slot 20 by the projecting end 30 of the chain-adjusting member.

While we have shown a construction providing only two axial positions of the plate 30 and chain 14, it will be understood that the invention is not limited to such an arrangement. Further, while we have disclosed the spacer block 33 as initially in place, it will be obvious that the device can be operated originally with the spacer block absent and the spacer block then inserted to move the chain outwardly of the sprocket 11. However, in most instances it will be desirable for the manufacturer to manufacture the chain saw with the spacer block in place, so that the operator need only remove and discard

We claim as our invention:

1. In a chain saw, a frame, a chain-driving sprocket rotatably supported from said frame, a saw-chain engaging said sprocket, a plate supporting cutting and return stretches of said chain and lying in a plane perpendicular to the axis of said sprocket, a spacer block disposed between the plate and frame, means acting on said plate for clamping it against said spacer block to locate the plate with the chain engaging the sprocket in a first plane, said sprocket having a face width greater than twice the width of the chain and said spacer block having a thickness greater than the width of the chain, said spacer block being removable from between the plate and frame to permit said clamping means to clamp the plate against the frame and the chain to engage the sprocket in a second plane spaced axially of the sprocket from said first plane.

2. The invention of claim 1 with the addition that said clamping means includes a clamp member engaging said plate, and means cooperating with said clamp member for adjusting said plate to tighten said chain.

3. The invention of claim 2 with the addition that said clamping means also includes a pair of screw-threaded members projecting from said frame and spaced apart longitudinally of said plate, said plate having a longitudinal slot, said screw-threaded members passing through said spacer block, slot, and clamp member, said plate-adjusting means including a chain-tightening member engageable with said plate and slidably received in said clamp plate, and means acting between said clamp plate and chain-tightening member for adjusting the latter and the plate.

4. In a chain saw, a frame, a chain-driving sprocket rotatably supported from said frame, a saw-chain engaging said sprocket, said sprocket having a face-width at least twice the width of said chain, a plate supporting cutting and return stretches of said chain, said plate lying in a plane perpendicular to the axis of said sprocket, and means for securing said plate to said frame in two alternative positions in which, respectively, the chain engages the sprocket in planes spaced apart by a distance greater than the width of the chain, said means including means for determining such two alternative positions.

References Cited in the file of this patent

UNITED STATES PATENTS

| | | |
|---|---|---|
| 2,032,609 | Arsneau | Mar. 3, 1936 |
| 2,718,908 | Kiekhaefer | Sept. 27, 1955 |
| 2,839,097 | Siria | June 17, 1958 |